(12) United States Patent  
Ueda

(10) Patent No.: US 10,429,820 B2  
(45) Date of Patent: Oct. 1, 2019

(54) SLICED MODEL GENERATING APPARATUS AND THREE-DIMENSIONAL PRINTING SYSTEM

(71) Applicant: Roland DG Corporation, Hamamatsu-shi, Shizuoka (JP)

(72) Inventor: Jun Ueda, Hamamatsu (JP)

(73) Assignee: ROLAND DG CORPORATION, Shizuoka (JP)

( * ) Notice: Subject to any disclaimer, the term of this patent is extended or adjusted under 35 U.S.C. 154(b) by 498 days.

(21) Appl. No.: 15/095,335

(22) Filed: Apr. 11, 2016

(65) Prior Publication Data

US 2016/0297150 A1   Oct. 13, 2016

(30) Foreign Application Priority Data

Apr. 13, 2015 (JP) ................. 2015-081500

(51) Int. Cl.
```
G06T 19/00     (2011.01)
G05B 19/4099   (2006.01)
B33Y 50/02     (2015.01)
```

(52) U.S. Cl.  
CPC .......... *G05B 19/4099* (2013.01); *G06T 19/00* (2013.01); *B33Y 50/02* (2014.12); (Continued)

(58) Field of Classification Search  
None  
See application file for complete search history.

(56) References Cited

U.S. PATENT DOCUMENTS

2009/0015584 A1* 1/2009 Shimizu ............... G06T 17/20  
                                                                       345/420  
2010/0214333 A1    8/2010 Matsui et al.  
(Continued)

FOREIGN PATENT DOCUMENTS

JP    2000-177019 A    6/2000  
JP    2001-018297 A    1/2001  
(Continued)

OTHER PUBLICATIONS

Official Communication issued in corresponding European Patent Application No. 16164622.9, dated Nov. 16, 2016.

*Primary Examiner* — Thomas C Lee  
*Assistant Examiner* — Gary Collins  
(74) *Attorney, Agent, or Firm* — Keating & Bennett, LLP

(57) ABSTRACT

A sliced model generating apparatus includes a storage, a generator, an information adder, a converter, an area setter, and a color adder. The storage stores a three-dimensional model that includes attribute information including at least color information. The generator generates a contour polyline including a plurality of line segments. The information adder associates the line segments with the attribute information of the three-dimensional model. The converter converts the contour polyline whose line segments are associated with the attribute information into an image coordinate system. The area setter sets, in a region surrounded by the contour polyline converted into the image coordinate system, each of areas targeted for coloring adjacent to a corresponding one of the line segments. The color adder colors each of the areas targeted for coloring with a color based on the attribute information associated with a corresponding one of the line segments, thus generating a sliced model.

5 Claims, 18 Drawing Sheets

(52) U.S. Cl.
CPC .............. *G05B 2219/35134* (2013.01); *G05B 2219/49007* (2013.01); *G06T 2219/008* (2013.01)

(56) References Cited

U.S. PATENT DOCUMENTS

| | | |
|---|---|---|
| 2011/0222081 A1 | 9/2011 | Yi et al. |
| 2012/0224755 A1 | 9/2012 | Wu |
| 2013/0095302 A1* | 4/2013 | Pettis ..................... B29C 64/20 428/195.1 |
| 2013/0138234 A1 | 5/2013 | Dufort et al. |
| 2015/0029187 A1 | 1/2015 | Nakamura |
| 2015/0251357 A1* | 9/2015 | Jin .......................... G05B 15/02 700/119 |
| 2015/0321425 A1* | 11/2015 | Stava ...................... G06F 17/50 700/98 |
| 2017/0364316 A1* | 12/2017 | Morovic ............... G06F 3/1245 |

FOREIGN PATENT DOCUMENTS

| | | |
|---|---|---|
| JP | 2009-015792 A | 1/2009 |
| JP | 2011-065396 A | 3/2011 |
| JP | 2013-114676 A | 6/2013 |
| JP | 5533574 B2 | 6/2014 |
| JP | 2015-024631 A | 2/2015 |
| JP | 2015-063099 A | 4/2015 |
| WO | 2014/141273 A2 | 9/2014 |

\* cited by examiner

SLICED MODEL GENERATING APPARATUS AND THREE-DIMENSIONAL PRINTING SYSTEM

This application claims priority to Patent Application No. 2015-81500 filed in Japan on Apr. 13, 2015, the entire contents of which are hereby incorporated by reference.

BACKGROUND OF THE INVENTION

1. Field of the Invention

The present invention relates to sliced model generating apparatuses and three-dimensional printing systems.

2. Description of the Related Art

Three-dimensional printing apparatuses for printing three-dimensional objects are known in the related art. Such a three-dimensional printing apparatus creates, utilizing a computer program, data of a three-dimensional model used in printing a three-dimensional object. The three-dimensional printing apparatus slices the three-dimensional model at predetermined intervals, thus creating sliced models. Each sliced model represents a cross-sectional shape of the three-dimensional object. The three-dimensional printing apparatus applies a binder (or an adhesive) to powdery materials, and sequentially stacks the layers of the powdery materials each having a cross-sectional shape conforming to the associated sliced model, thus printing the three-dimensional object.

To generate sliced models, stereolithography (STL) data is used as data of a three-dimensional model. STL data includes: normal vectors of planes of triangles included in a three-dimensional model; and coordinate values of three vertices of each triangle.

A conventional sliced model generating method is performed as follows. Using a computer program, a three-dimensional model is read from STL data, and the three-dimensional model is sliced at predetermined intervals so as to determine intersections of the three-dimensional model and a slicing plane (e.g., a plane whose normal vector is parallel to a Z axis). The intersections determined are connected to each other to generate a contour polyline including a plurality of line segments. The contour polyline generated is converted into an output image coordinate system. The inside and outside of a region surrounded by the contour polyline are respectively filled in with white and black by scan conversion. Thus, a sliced model is generated.

Unfortunately, in performing such a conventional sliced model generating method, a contour polyline is associated with only coordinate information and no consideration is given to attribute information, such as color information, in the course of generating a sliced model. This means that the conventional sliced model generating method is unable to generate a sliced model rendered in full color.

SUMMARY OF THE INVENTION

Accordingly, preferred embodiments of the present invention provide a sliced model generating apparatus and a three-dimensional printing system that slice, at predetermined intervals, a three-dimensional model for a three-dimensional object to be printed, and generate data of full-color sliced models.

A sliced model generating apparatus according to a preferred embodiment of the present invention slices, at predetermined intervals, a three-dimensional model for a three-dimensional object to be printed, and thus generates sliced models each representing a cross section of the three-dimensional object. The sliced model generating apparatus includes a storage, a generator, an information adder, a converter, an area setter, and a color adder. The storage stores a three-dimensional model that includes attribute information including at least color information. The generator slices, at predetermined intervals, the three-dimensional model stored in the storage, thus generating a contour polyline including a plurality of line segments. The information adder associates each of the line segments with the attribute information of the three-dimensional model. The converter converts the contour polyline whose line segments are associated with the attribute information into an image coordinate system. The area setter sets a plurality of areas targeted for coloring in a region surrounded by the contour polyline converted into the image coordinate system. Each of the areas targeted for coloring is adjacent to a corresponding one of the line segments. The color adder colors each of the areas targeted for coloring with a color based on the attribute information associated with a corresponding one of the line segments, thus generating a sliced model.

A sliced model generating apparatus according to a preferred embodiment of the present invention generates full-color sliced models from a three-dimensional model that includes attribute information including, for example, color information. More specifically, the sliced model generating apparatus generates full-color sliced models in accordance with a three-dimensional model that includes not only information on normal vectors of planes of triangles included in the three-dimensional model and coordinate values of three vertices of each triangle, but also attribute information, such as color information. Using the full-color sliced models generated, a three-dimensional printing apparatus that is separate from the sliced model generating apparatus, for example, applies a binder to powdery materials, and sequentially stacks the layers of the powdery materials each having a cross-sectional shape conforming to the associated sliced model, thus printing a three-dimensional object in full color.

Various preferred embodiments of the present invention provide a sliced model generating apparatus and a three-dimensional printing system that slice, at predetermined intervals, a three-dimensional model for a three-dimensional object to be printed, and generate data of full-color sliced models.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Three-dimensional printing system including sliced model generating apparatuses according to preferred embodiments of the present invention will be described below with reference to the drawings. The preferred embodiments described below are naturally not intended to limit the present invention in any way. Components or elements having the same functions are identified by the same reference signs, and description thereof will be simplified or omitted when deemed redundant.

Figure 1:
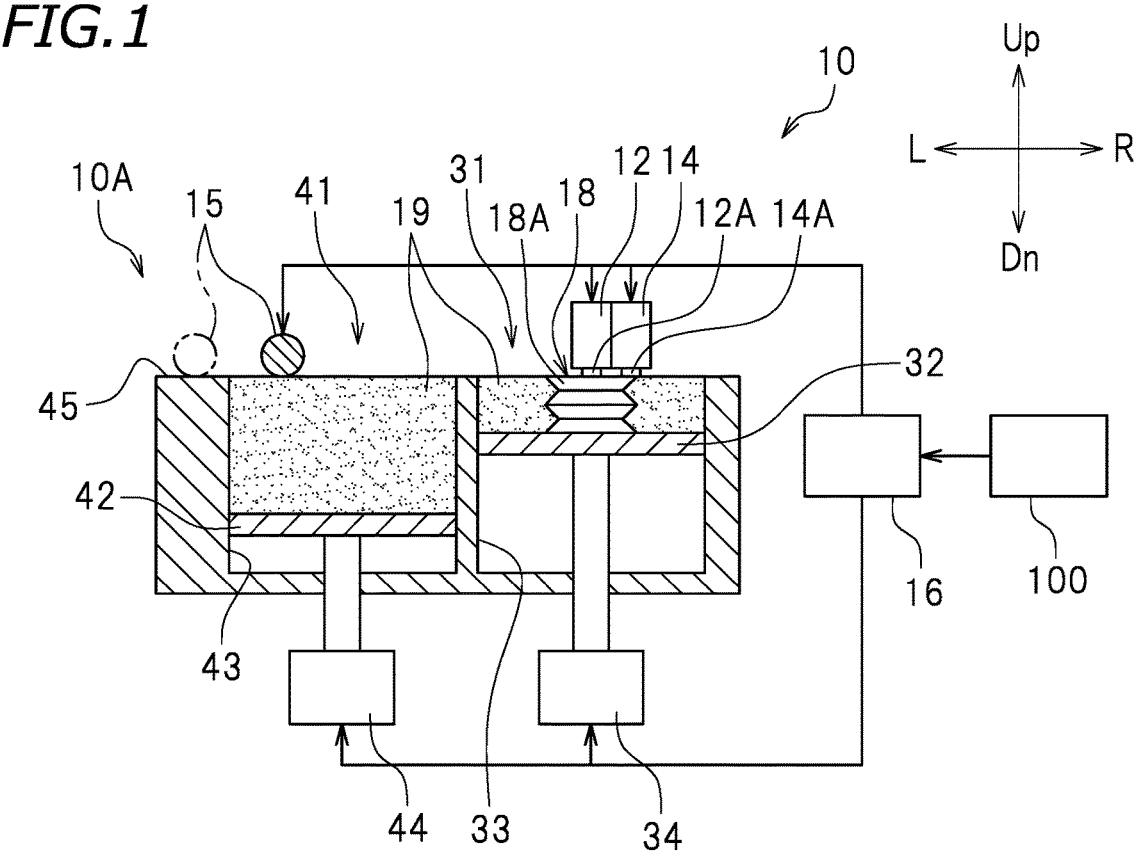
FIG. 1 is a cross-sectional view of a three-dimensional printing system according to a preferred embodiment of the present invention.
Figure 2:
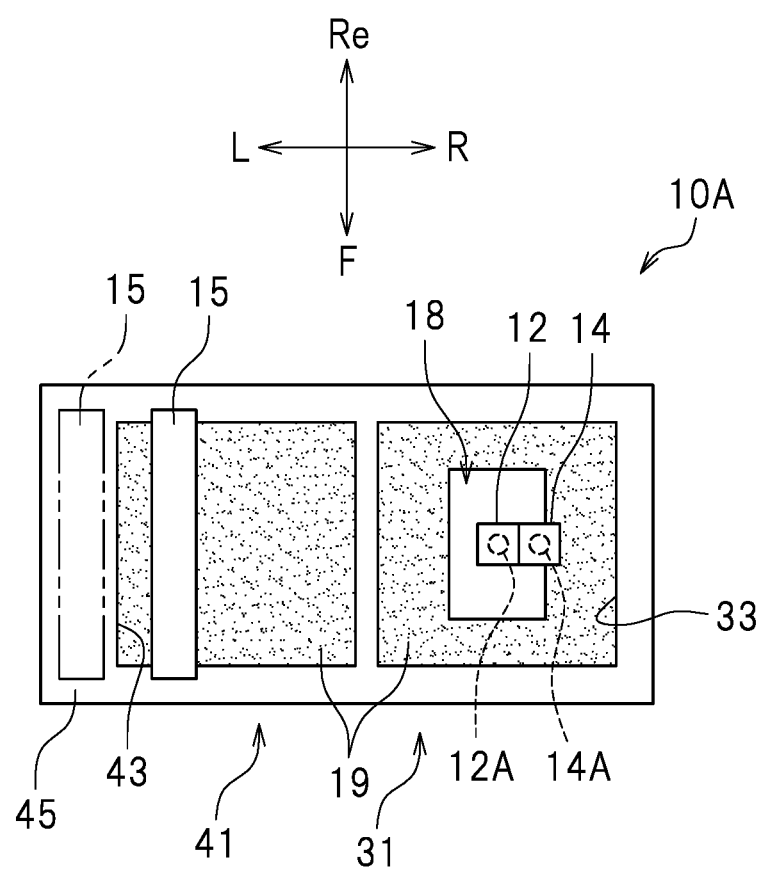
FIG. 2 is a plan view of a three-dimensional printing apparatus according to a preferred embodiment of the present invention.

FIG. 1 is a cross-sectional view of a three-dimensional printing system 10 according to a preferred embodiment of the present invention. FIG. 2 is a plan view of a three-dimensional printing apparatus 10A according to a preferred embodiment of the present invention. The reference signs "F", "Re", "R", "L", "Up", and "Dn" in FIGS. 1 and 2 respectively represent front, rear, right, left, up, and down. These directions are defined merely for the sake of convenience and thus do not limit in any way how the three-dimensional printing system 10 may be installed.

The three-dimensional printing system 10 is configured to print a three-dimensional object in full color. As illustrated in FIG. 1, the three-dimensional printing system 10 preferably includes the three-dimensional printing apparatus 10A, and a sliced model generating apparatus 100. Using full-color sliced models representing cross-sectional shapes of a three-dimensional object, the three-dimensional printing apparatus 10A applies a binder (or an adhesive) to powdery materials, cures the powdery materials, and sequentially stacks the layers of the powdery materials each having a cross-sectional shape conforming to the associated full-color sliced model, thus printing a full-color three-dimensional object. When the three-dimensional printing apparatus 10A is configured to eject ink so as to print a full-color three-dimensional object, the three-dimensional printing apparatus 10A does not necessarily have to apply a binder to powdery materials. As used herein, the term "cross-sectional shape" refers to a cross-sectional shape obtained by slicing a three-dimensional object at predetermined intervals (e.g., about 0.1 mm intervals). The term "powdery material" refers to, for example, plaster, ceramic, metal, and/or plastic. The term "adhesive" refers to any material capable of binding the powdery materials to each other. The three-dimensional printing apparatus 10A preferably includes a printer 31, a powdery material feeder 41, a binder supply head 12, an ink head 14, and a controller 16.

The printer 31 prints a three-dimensional object 18. The printer 31 preferably includes a printing tank 33, a printing table 32, and a table lifting and lowering device 34. In the printing tank 33, powdery material layers 18A are stacked on the printing table 32 so as to print the three-dimensional object 18. The printing tank 33 stores powdery materials 19 fed from the powdery material feeder 41. The printing table 32 moves upward and downward in the printing tank 33. The printing table 32 is connected to the table lifting and lowering device 34. The table lifting and lowering device 34 causes the printing table 32 to move upward and downward. Following the formation of each powdery material layer 18A on the printing table 32, the table lifting and lowering device 34 causes the printing table 32 to move downward.

The powdery material feeder 41 feeds the powdery materials 19 to the printer 31. The powdery material feeder 41 preferably includes a powdery material feeder tank 43, a powdery material feeder table 42, a table lifting and lowering device 44, and a powdery material feeder roller 15. The powdery material feeder tank 43 stores the powdery materials 19. The powdery material feeder table 42 moves upward and downward in the powdery material feeder tank 43. The powdery material feeder table 42 is connected to the table lifting and lowering device 44. The table lifting and lowering device 44 causes the powdery material feeder table 42 to move upward and downward. When the powdery materials 19 are fed from the powdery material feeder tank 43 to the printing tank 33, the table lifting and lowering device 44 causes the powdery material feeder table 42 to move upward. The distance travelled by the powdery material feeder table 42 moved upward is equal to or substantially equal to the distance travelled by the printing table 32 moved downward. The powdery material feeder roller 15 feeds the powdery materials 19, stored in the powdery material feeder tank 43, into the printing tank 33. The powdery material feeder roller 15 is moved rightward and leftward on the powdery material feeder tank 43 by a motor (not illustrated). As illustrated in FIGS. 1 and 2, the powdery material feeder roller 15 comes to rest at a home position 45 on the powdery material feeder 41. The rightward movement of the powdery material feeder roller 15 from the home position 45 causes the powdery materials in the powdery material feeder tank 43 to be fed into the printing tank 33. Following the return of the powdery material feeder roller 15 to the home position 45, the table lifting and lowering device 44 causes the powdery material feeder table 42 to move upward.

The binder supply head 12 applies a binder to the powdery materials 19 fed to the printing tank 33. More specifically, the binder supply head 12 applies a binder to targeted ones of the powdery materials 19 that are stored in the printing tank 33 and will form a cross-sectional shape conforming to the associated full-color sliced model. The binder supply head 12 preferably includes a nozzle 12A to eject a binder. The nozzle 12A is connected to a binder storage tank (not illustrated). The binder supply head 12 is connected to a driving device (not illustrated) so as to be movable forward, rearward, rightward, and leftward above the printing tank 33.

The ink head 14 applies ink to the powdery materials 19 to which the binder has been applied. More specifically, the ink head 14 applies ink of a color suitable for the full-color sliced model to the powdery materials 19 to which the binder has been applied. The ink head 14 preferably includes a nozzle 14A to eject ink. The nozzle 14A is connected to a plurality of ink storage tanks (not illustrated). The ink head 14 is connected to a driving device (not illustrated) so as to be movable forward, rearward, rightward, and leftward above the printing tank 33. The binder supply head 12 and the ink head 14 are integral with each other in this preferred embodiment, but may be separate from each other.

The controller 16 is connected to the binder supply head 12, the ink head 14, the powdery material feeder roller 15, the table lifting and lowering device 34, the table lifting and lowering device 44, and the sliced model generating apparatus 100. The controller 16 is configured or programmed to drive the table lifting and lowering device 34, thus moving the printing table 32 upward or downward. The controller 16 is configured or programmed to drive the table lifting and lowering device 44, thus moving the powdery material feeder table 42 upward or downward. The controller 16 is configured or programmed to control binder ejection from the binder supply head 12 and the movement of the binder supply head 12. The controller 16 is configured or programmed to control ink ejection from the ink head 14 and the movement of the ink head 14. The controller 16 is configured or programmed to control the movement of the powdery material feeder roller 15. The controller 16 is fed data of full-color sliced models from the sliced model generating apparatus 100. The controller 16 is not limited to any particular configuration. In one example, the controller 16 may be a computer that includes a central processing unit (CPU), a read-only memory (ROM) storing, for example, a program to be executed by the CPU, and a random-access memory (RAM).

The sliced model generating apparatus 100 according to this preferred embodiment prepares a three-dimensional model for a three-dimensional object to be printed. As used herein, the term "three-dimensional model" refers to a polygon mesh model. A three-dimensional model is horizontally sliced at predetermined intervals, thus generating a plurality of two-dimensional sliced models corresponding to cross-sectional shapes of a three-dimensional object. The direction in which a three-dimensional model is to be sliced is not limited to a horizontal direction but may be a vertical direction, for example. The three-dimensional printing apparatus 10A applies a binder to the powdery materials 19, and sequentially stacks the powdery material layers 18A each having a cross-sectional shape conforming to the associated sliced model, thus printing the three-dimensional object 18.

The sliced model generating apparatus 100 generates full-color sliced models representing cross sections obtained by slicing, at predetermined intervals, a three-dimensional model for a three-dimensional object to be printed. The sliced model generating apparatus 100 may be separate from the three-dimensional printing apparatus 10A or may be incorporated into the three-dimensional printing apparatus 10A. In one example, the sliced model generating apparatus 100 may be a computer that includes a CPU, a ROM storing, for example, a program to be executed by the CPU, and a RAM. In this example, the program stored in the computer is used to generate full-color sliced models. The sliced model generating apparatus 100 may be a computer dedicated to the three-dimensional printing system 10 or may be a general-purpose computer.

Figure 3:
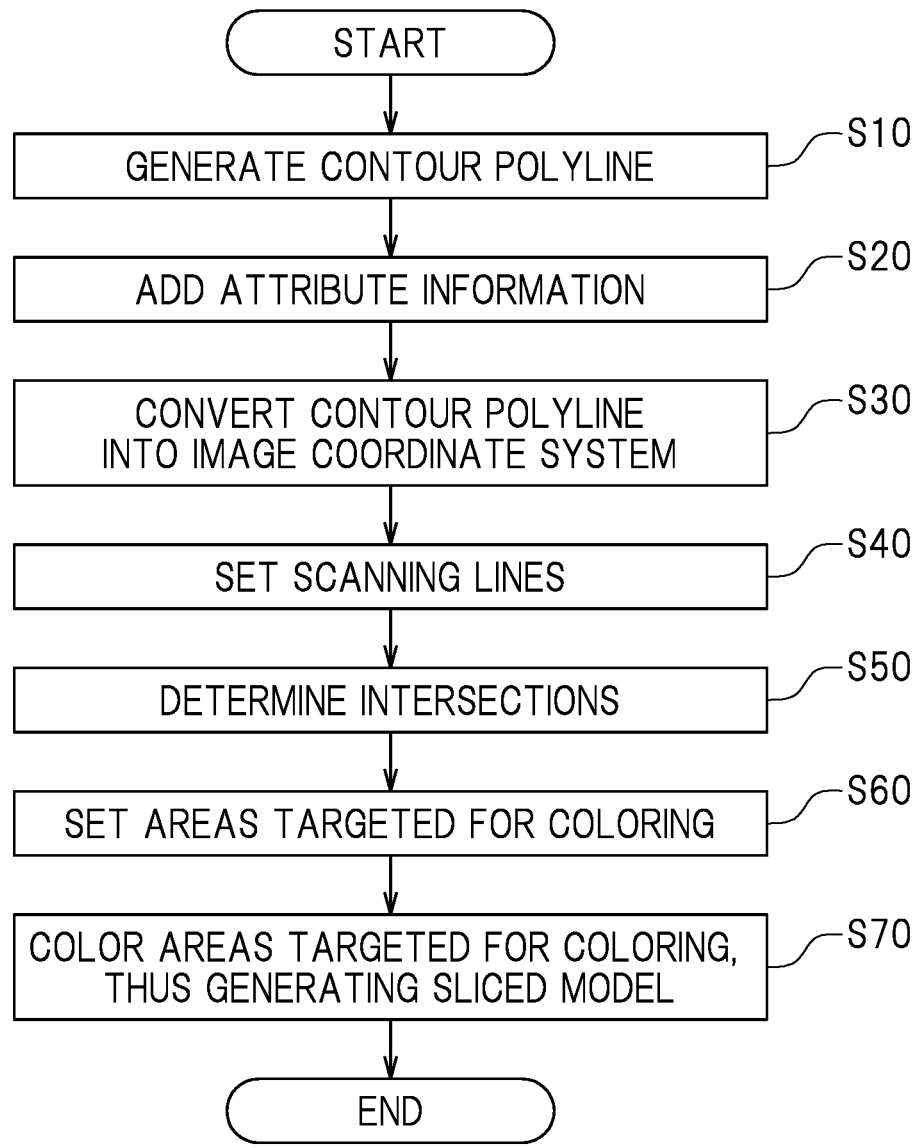
FIG. 3 is a flow chart illustrating a procedure for generating a full-color sliced model.

As illustrated in FIG. 3, the sliced model generating apparatus 100 generates a full-color sliced model. First, in step S10, a contour polyline including a plurality of cut line segments is generated. In step S20, each cut line segment is associated with attribute information. In step S30, the contour polyline associated with the attribute information is converted into a bitmap output image coordinate system. In step S40, scanning lines are set for the contour polyline, which has been converted into the bitmap output image coordinate system. In step S50, the intersections of the contour polyline with the scanning lines are determined. In step S60, areas targeted for coloring are set. In step S70, the areas targeted for coloring are colored, thus generating a full-color sliced model.

Figure 4:
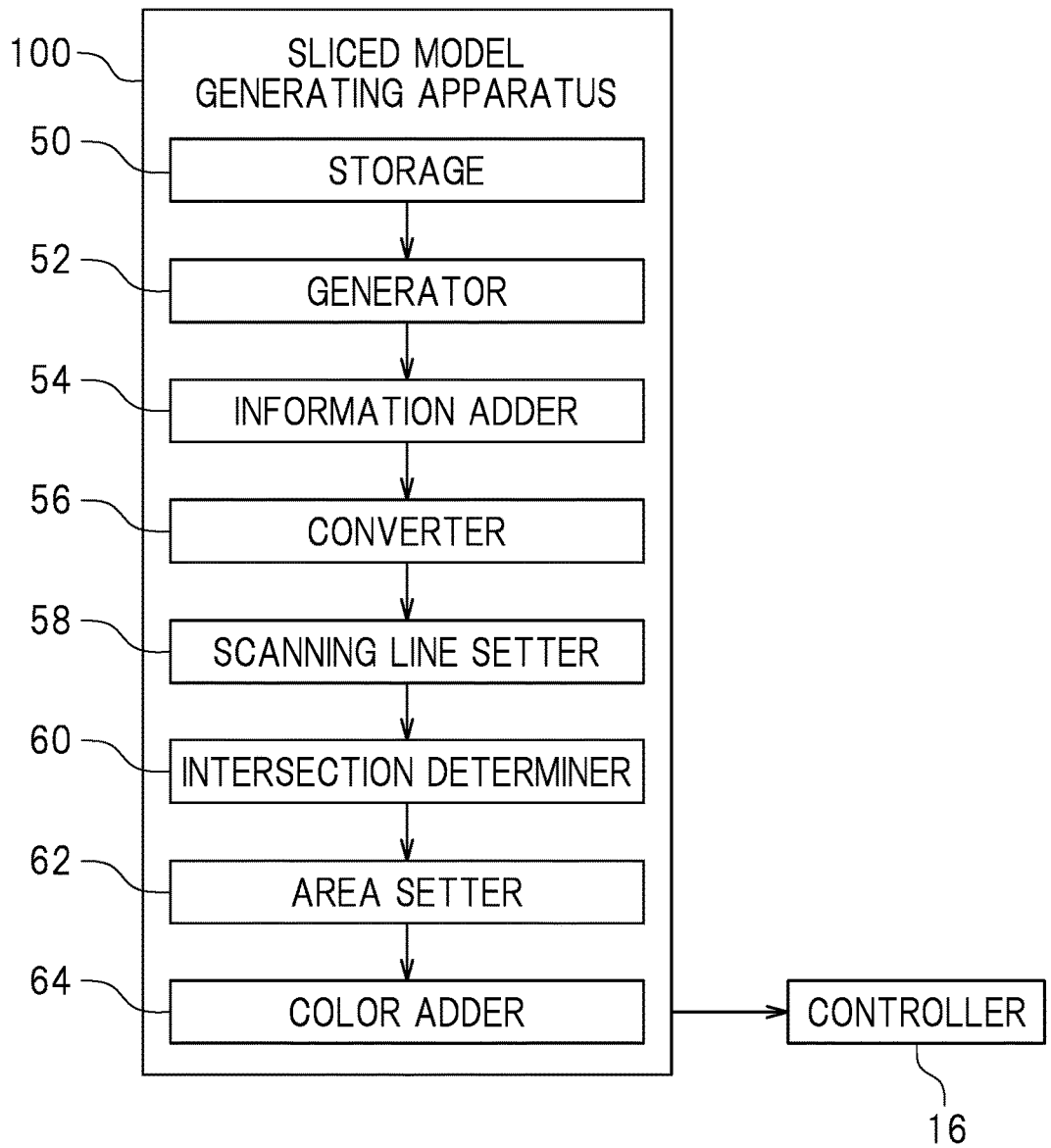
FIG. 4 is a block diagram of a sliced model generating apparatus according to a preferred embodiment of the present invention.

As illustrated in FIG. 4, the sliced model generating apparatus 100 preferably includes a storage 50, a generator 52, an information adder 54, a converter 56, a scanning line setter 58, an intersection determiner 60, an area setter 62, and a color adder 64.

Figure 5A:
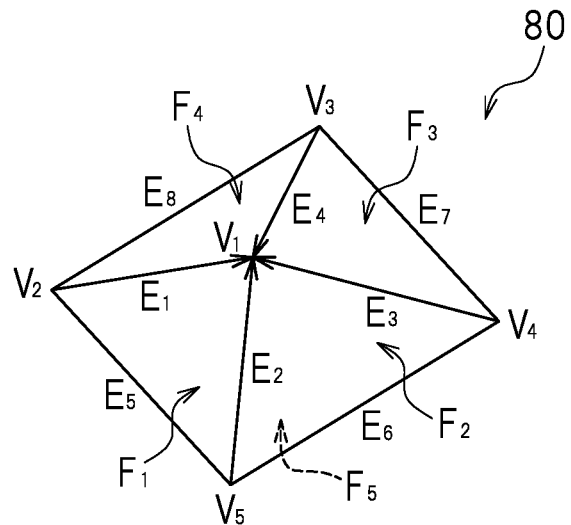
FIG. 5A is a schematic diagram illustrating a three-dimensional model.
Figure 5B:
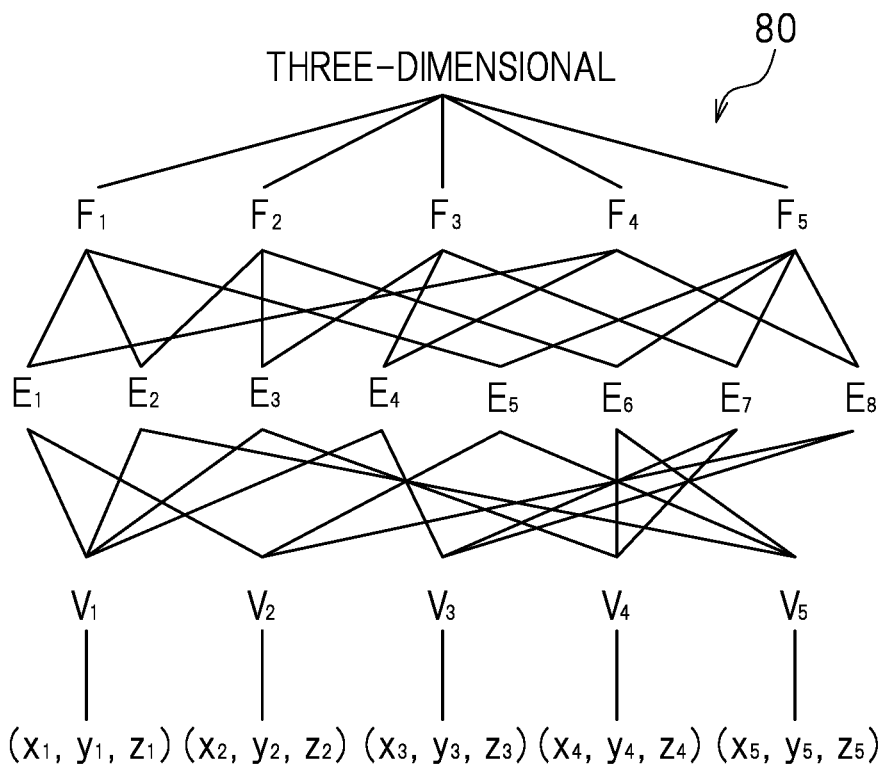
FIG. 5B is a schematic diagram illustrating a boundary representation of the three-dimensional model.
Figure 5C:
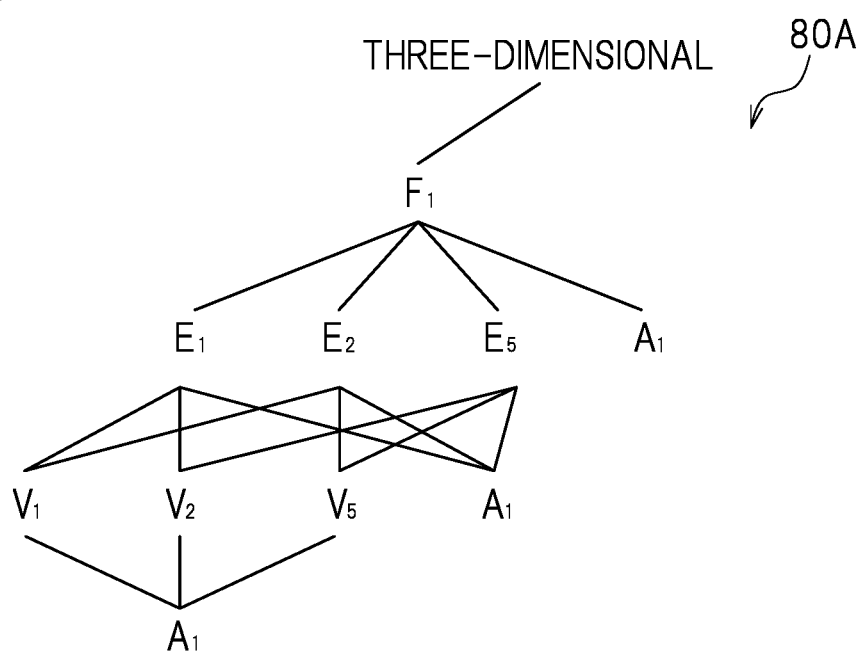
FIG. 5C is a schematic diagram illustrating a boundary representation of the three-dimensional model to which attribute information is added.

The storage 50 stores a three-dimensional model including attribute information. More specifically, the storage 50 stores STL data including: normal vectors of planes of triangles included in a three-dimensional model for a three-dimensional object to be printed; and coordinate values of three vertices of each triangle. The attribute information includes color information and reflection information. The attribute information may include at least color information. The color information is represented using an RGB value. The reflection information is represented using, for example, a diffuse reflection coefficient, an environmental reflection coefficient, and a mirror reflection coefficient. As illustrated in FIGS. 5A and 5B, the storage 50 manages information of a three-dimensional model 80 using a known boundary representation. Specifically, a vertex $V_i$ has three-dimensional coordinate values $(x_i, y_i, z_i)$. A ridge $E_i$ has information of vertices at the ends of the ridge $E_i$. A plane $F_i$ has information of three ridges surrounding the plane $F_i$. The ridges surrounding a plane are in a clockwise order relative to the direction in which a normal vector of the plane extends. In this preferred embodiment, the three-dimensional model 80 having a quadrangular pyramidal shape is provided by way of example. As illustrated in FIG. 5C, the storage 50 stores a three-dimensional model 80A obtained by adding attribute information $A_i$ to the information of the three-dimensional model 80 managed using a known boundary representation. For the sake of convenience, FIG. 5C illustrates only a portion of the boundary representation illustrated in FIG. 5B. In the example illustrated in FIG. 5C, attribute information $A_1$ is added to each of a plane $F_1$, ridges $E_1$, $E_2$, and $E_5$, and vertices $V_1$, $V_2$, and $V_5$. The storage 50 may be separate from the sliced model generating apparatus 100.

The generator 52 (see FIG. 4) slices, at predetermined intervals, the three-dimensional model stored in the storage 50 so as to generate a contour polyline including a plurality of cut line segments. Specifically, the generator 52 reads information of the three-dimensional model from STL data stored in the storage 50. The generator 52 cuts the three-dimensional model along a plane having any desired Z coordinate, or a slicing plane, so as to obtain a contour polyline representing the contour of the cross section of the three-dimensional model taken along this plane. In other words, the generator 52 determines the coordinates of the intersection of each ridge of the three-dimensional model with the slicing plane (i.e., the plane whose normal vector is parallel to the Z axis). The coordinates of each intersection is associated with a corresponding one of the ridges. In this preferred embodiment, the direction in which the contour polyline extends is set such that the contour polyline extends clockwise when the three-dimensional model is viewed from above along the Z axis. Suppose that one of two ridges is associated with intersection coordinates, the other ridge is associated with different intersection coordinates, and the two ridges define a single plane. In this case, the intersection of one of the ridges with a slicing plane is connected to the intersection of the other ridge with the slicing plane, thus obtaining a single cut line segment. The direction in which the intersections are to be connected to each other is decided in a manner described below. The generator 52 performs processes involved in step S10 in FIG. 3.

Figure 6A:
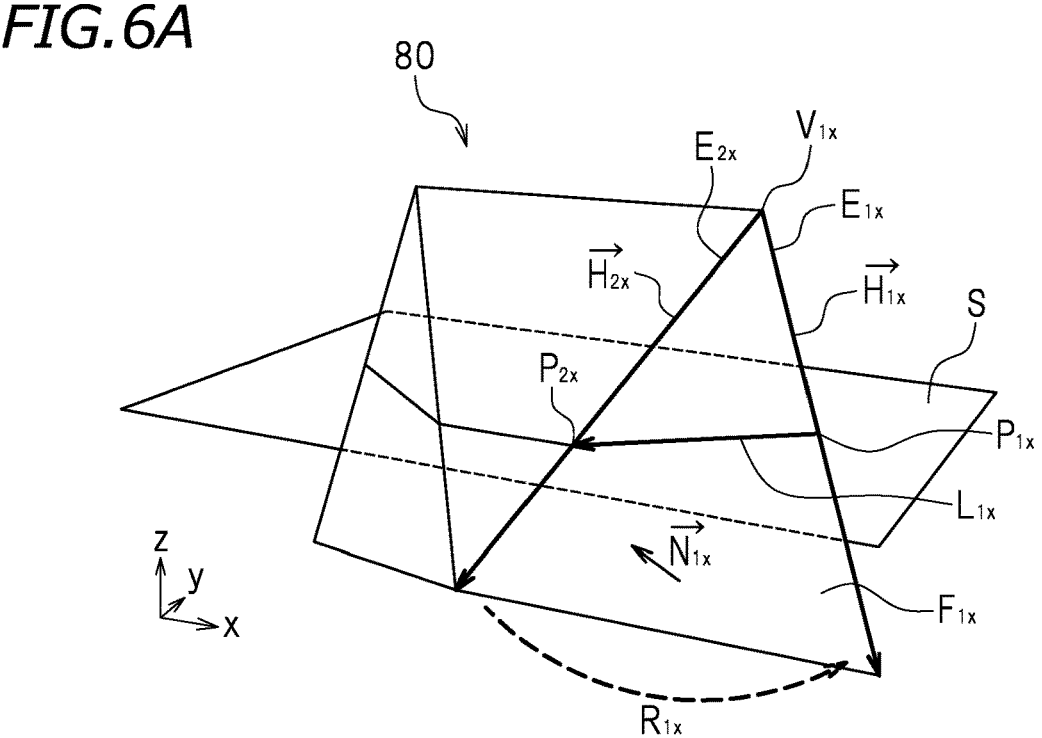
FIG. 6A is a schematic diagram illustrating how a cut line segment of the three-dimensional model is obtained.

As illustrated in FIG. 6A, supposing that an extreme point $V_{1x}$ of a first ridge $E_{1x}$ and an extreme point $V_{1x}$ of a second ridge $E_{2x}$ are located at the same coordinates above a slicing plane S along the Z axis, a starting point and an end point are set so that a rotating direction $R_{1x}$ from a downward vector $H_{2x}$ of the second ridge $E_{2x}$ to a downward vector $H_{1x}$ of the first ridge $E_{1x}$ is identical to the direction of a normal vector $N_{1x}$ of a first plane $F_{1x}$. In this case, with the first ridge $E_{1x}$ having the starting point and the second ridge $E_{2x}$ having the end point, an intersection $P_{1x}$ of the first ridge $E_{1x}$ with the slicing plane S and an intersection $P_{2x}$ of the second ridge $E_{2x}$ with the slicing plane S are determined. Then, the intersection $P_{1x}$ is connected to the intersection $P_{2x}$, thus obtaining a cut line segment $L_{1x}$.

Figure 6B:
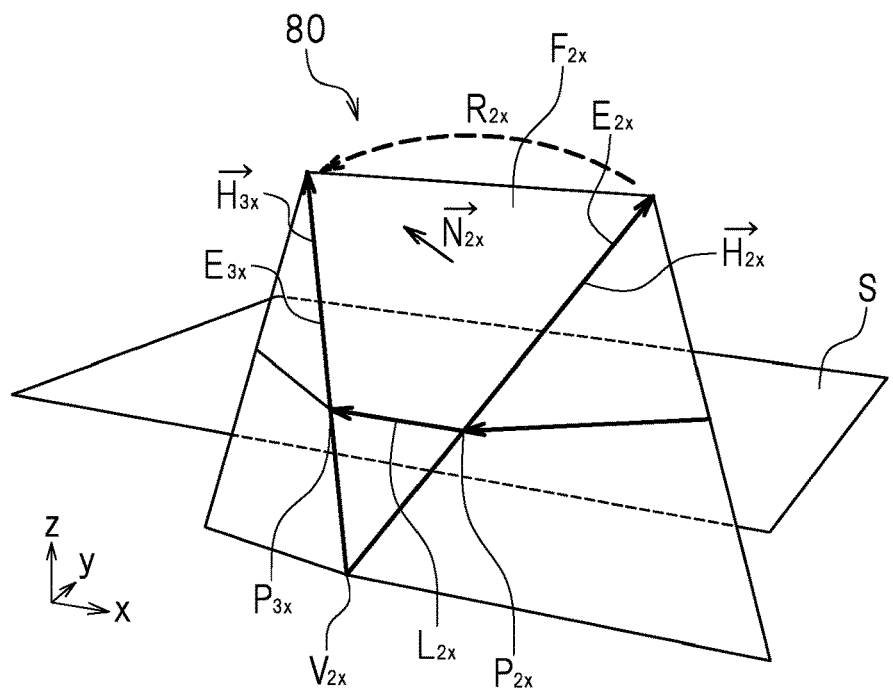
FIG. 6B is a schematic diagram illustrating how a cut line segment of the three-dimensional model is obtained.
Figure 6C:
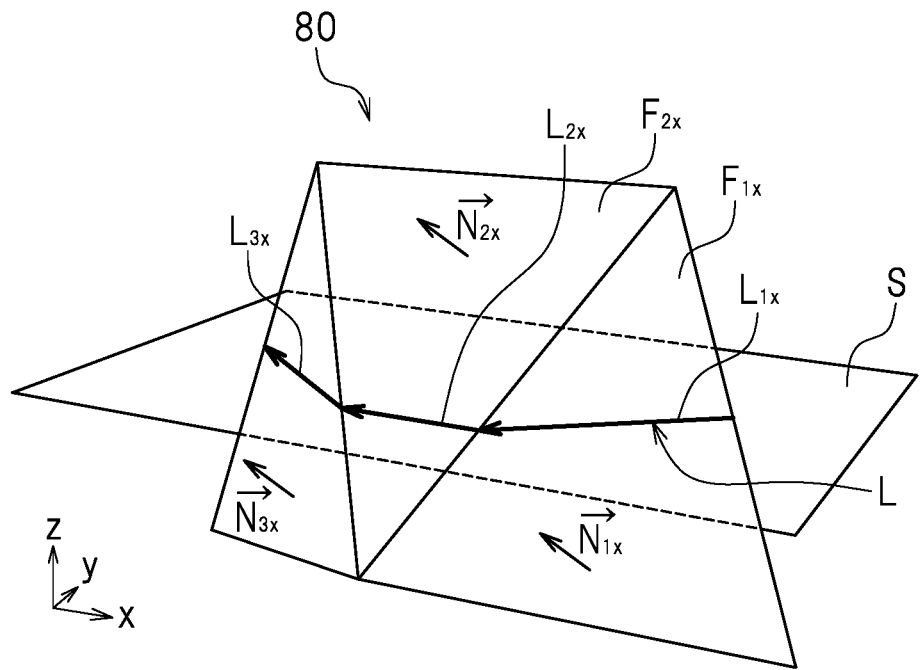
FIG. 6C is a schematic diagram illustrating a contour polyline of the three-dimensional model.

As illustrated in FIG. 6B, supposing that an extreme point $V_{2x}$ of the second ridge $E_{2x}$ and an extreme point $V_{2x}$ of a third ridge $E_{3x}$ are located at the same coordinates below the slicing plane S along the Z axis, a starting point and an end point are set so that a rotating direction $R_{2x}$ from an upward vector $H_{2x}$ of the second ridge $E_{2x}$ to an upward vector $H_{3x}$ of the third ridge $E_{3z}$ is identical to the direction of a normal vector $N_{2x}$ of a second plane $F_{2x}$. In this case, with the second ridge $E_{2x}$ having the starting point and the third ridge $E_{3x}$ having the end point, an intersection $P_{2x}$ of the second ridge $E_{2x}$ with the slicing plane S and an intersection $P_{3x}$ of the third ridge $E_{3x}$ with the slicing plane S are determined. Then, the intersection $P_{2x}$ is connected to the intersection $P_{3x}$, thus obtaining a cut line segment $L_{2x}$. These processes are repeated until a return is made to the intersection from which tracking has started (e.g., the intersection $P_{1x}$), thus generating a contour polyline including a plurality of cut line segments. For the sake of convenience, FIG. 6C illustrates a contour polyline L including three cut line segments, i.e., the cut line segments $L_{1x}$, $L_{2x}$, and $L_{3x}$.

Figure 6D:
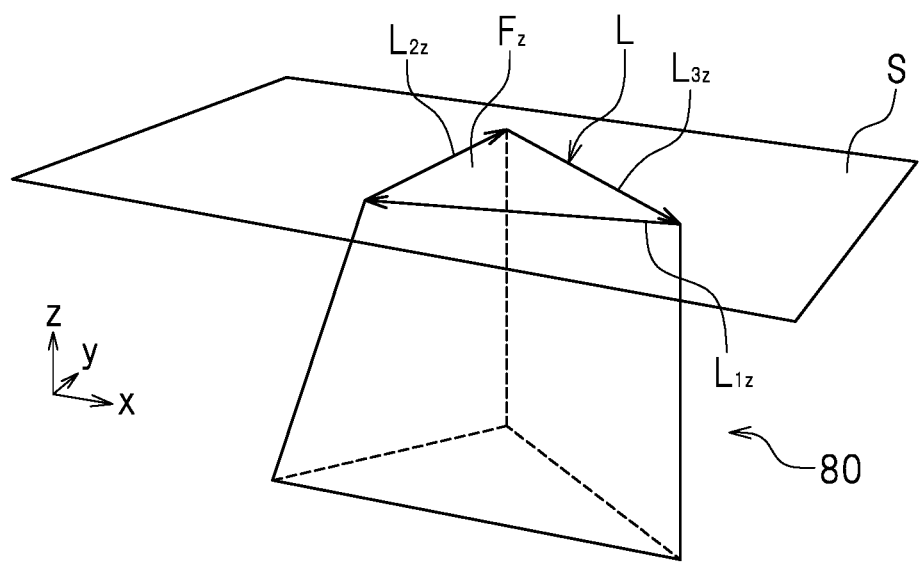
FIG. 6D is a schematic diagram illustrating another contour polyline of the three-dimensional model.

As illustrated in FIG. 6D, when the three-dimensional model 80 stored in the storage 50 is sliced at predetermined intervals and the slicing plane S overlaps with a plane $F_z$ inside the contour polyline L including a plurality of cut line segments $L_{1z}$, $L_{2z}$, and $L_{3z}$, the generator 52 generates the contour polyline L for each triangular patch. The three-dimensional model 80 illustrated in FIGS. 6A to 6C and the three-dimensional model 80 illustrated in FIG. 6D are each different from the three-dimensional model 80 illustrated in FIG. 5A.

The information adder 54 (see FIG. 4) associates each cut line segment of the generated contour polyline with three-dimensional model attribute information. More specifically, the information adder 54 associates each cut line segment $L_i$ of the generated contour polyline L with the attribute information $A_i$ of the plane $F_i$ including each cut line segment $L_i$. The information adder 54 further associates each cut line segment $L_i$ of the generated contour polyline L with a normal vector $N_i$ of the plane $F_i$ including each cut line segment $L_i$. In the example illustrated in FIG. 6C, the information adder 54 associates the cut line segment $L_{1x}$ of the contour polyline L with attribute information $A_{1x}$ and the normal vector $N_{1x}$. The information adder 54 associates the cut line segment $L_{2x}$ of the contour polyline L with attribute information $A_{2x}$ and the normal vector $N_{2x}$. The information adder 54 associates the cut line segment Lax of the contour polyline L with attribute information $A_{3x}$ and a normal vector $N_{3x}$. In the example illustrated in FIG. 6D, the information adder 54 associates the cut line segments $L_{1z}$, $L_{2z}$, and $L_{3z}$ of the contour polyline L with attribute information of the plane $F_z$. The information adder 54 performs processes involved in step S20 in FIG. 3.

Figure 7A:
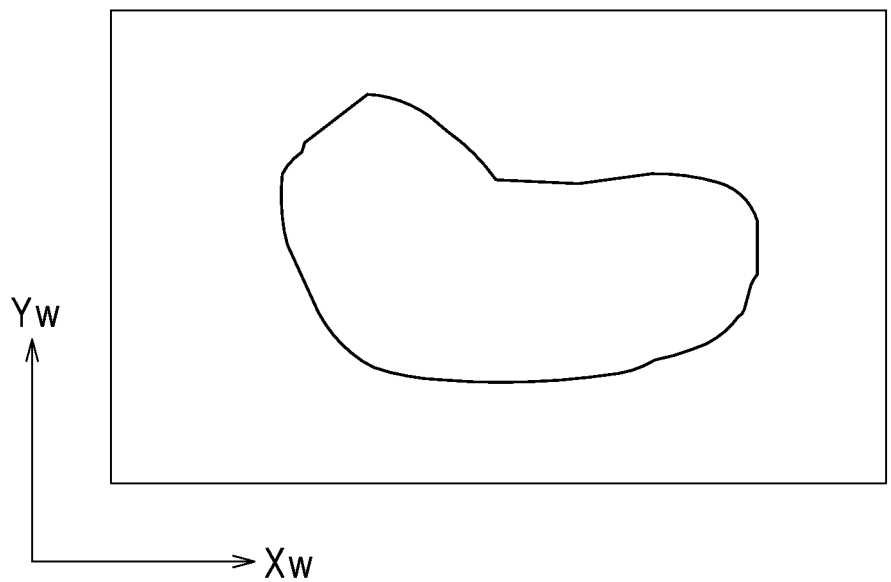
FIG. 7A is a schematic diagram illustrating a world coordinate system.
Figure 7B:
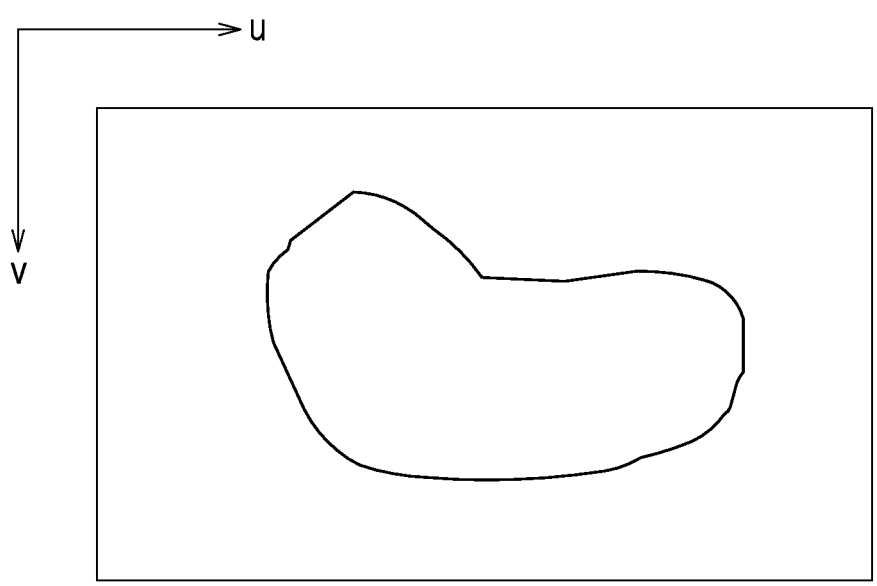
FIG. 7B is a schematic diagram illustrating an image coordinate system.

The converter 56 (see FIG. 4) converts a contour polyline associated with attribute information into a bitmap output image coordinate system. More specifically, the converter 56 converts intersection coordinate values of a contour polyline presented in a world coordinate system into intersection coordinate values of a contour polyline presented in a bitmap output image coordinate system. FIG. 7A illustrates a world coordinate system. FIG. 7B illustrates an image coordinate system. Suppose that world coordinate values are represented as $(X_w, Y_w)$, scaling factors used for conversion from a world coordinate system into an image coordinate system are represented as $(s_x, s_y)$, translation distances of image coordinate origins are represented as $(t_x, t_y)$, and H denotes a transformation matrix. In this case, coordinate values (u, v) in the image coordinate system are determined using Eq. (1) given below. The converter 56 performs processes involved in step S30 in FIG. 3.

$$\begin{bmatrix} u \\ v \\ 1 \end{bmatrix} = H \begin{bmatrix} X_w \\ Y_w \\ 1 \end{bmatrix}, H = \begin{bmatrix} s_x & 0 & t_x \\ 0 & s_y & t_y \\ 0 & 0 & 1 \end{bmatrix} \quad (1)$$

Suppose that the width and height of the world coordinate system are respectively represented as W [mm] and H [mm], and the width and height of the bitmap output image coordinate system are respectively represented as $w_{bmp}$ and $h_{bmp}$. In this case, parameters of the transformation matrix H are expressed by Eq. (2) given below. The width $w_{bmp}$ and the height $h_{bmp}$ may be set in accordance with any image size.

$$\begin{cases} s_x = w_{bmp}/W \\ s_y = -h_{bmp}/H \end{cases} \begin{cases} t_x = 0 \\ t_y = h_{bmp} \end{cases} \quad (2)$$

Figure 8:
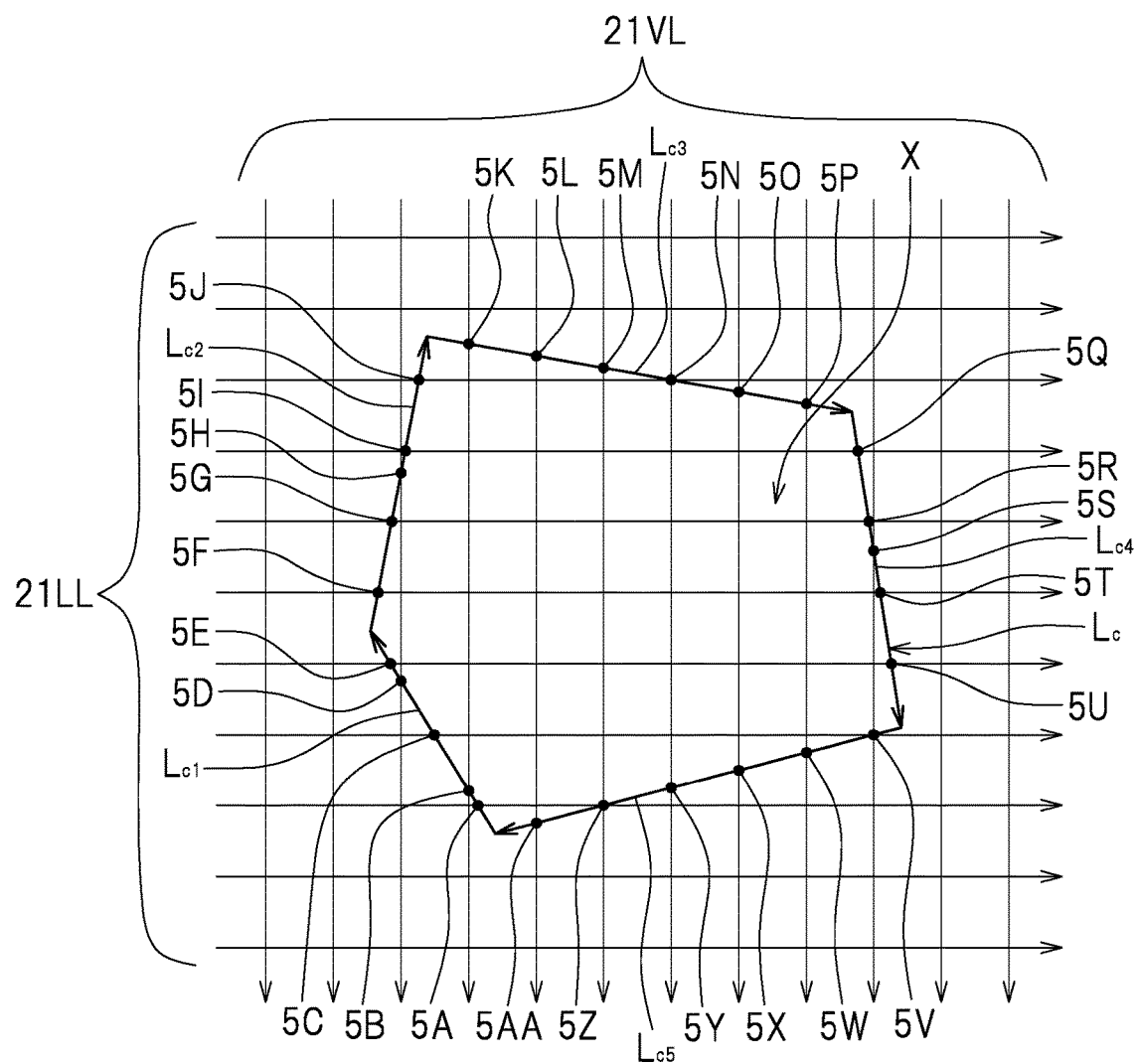
FIG. 8 is a schematic diagram illustrating how a plurality of scanning lines are set for a contour polyline.

The scanning line setter 58 (see FIG. 4) sets scanning lines each extending in a predetermined direction, e.g., vertical scanning lines and horizontal scanning lines, so that the scanning lines intersect cut line segments included in a contour polyline that has been converted into a bitmap output image coordinate system. In the example illustrated in FIG. 8, the scanning line setter 58 sets vertical scanning lines 21VL and horizontal scanning lines 21LL so that the scanning lines 21VL and 21LL intersect cut line segments $L_{c1}$ to $L_{c5}$ included in a contour polyline $L_c$. In FIG. 8, the scanning lines 21VL extend downward from above, and the scanning lines 21LL extend from left to right. Each of square boxes in FIG. 8 represents a pixel of a bitmap image. In the example illustrated in FIG. 8, the cut line segment $L_{c1}$ is associated with the attribute information $A_1$ and a normal vector $N_1$, the cut line segment $L_{c2}$ is associated with attribute information $A_2$ and a normal vector $N_2$, the cut line segment $L_{c3}$ is associated with attribute information $A_3$ and a normal vector $N_3$, the cut line segment $L_{c4}$ is associated with attribute information $A_4$ and a normal vector $N_4$, and the cut line segment $L_{c5}$ is associated with attribute information $A_5$ and a normal vector $N_5$. The scanning line setter 58 performs processes involved in step S40 in FIG. 3.

The intersection determiner 60 (see FIG. 4) determines the intersections of a contour polyline with vertical and horizontal scanning lines. In the example illustrated in FIG. 8, the intersection determiner 60 determines intersections 5A to 5AA of the contour polyline $L_c$ with the scanning lines 21VL and 21LL. Specifically, the intersection determiner 60 determines the intersections 5A to 5AA of the cut line segments $L_{c1}$ to $L_{c5}$, which are included in the contour polyline $L_c$, with the scanning lines 21VL and 21LL. The intersection determiner 60 performs processes involved in step S50 in FIG. 3.

The area setter 62 (see FIG. 4) sets areas targeted for coloring in a region surrounded by a contour polyline that has been converted into a bitmap output image coordinate system by the converter 56. In the example illustrated in FIG. 9, the area setter 62 sets areas $Q_i$ targeted for coloring in a region X surrounded by the contour polyline $L_c$. Each area $Q_i$ targeted for coloring is adjacent to a corresponding one of the cut line segments $L_{c1}$ to $L_{c5}$ and is opposite to the direction of a corresponding one of the normal vectors $N_1$ to $N_5$ respectively associated with the cut line segments $L_{c1}$ to $L_{c5}$. The area setter 62 may set, at positions inward of the areas $Q_i$ targeted for coloring, areas $B_i$ untargeted for coloring that are not to be colored with colors based on the attribute information associated with the cut line segments $L_{c1}$ to $L_{c5}$. In other words, the area setter 62 may divide the region X into the areas $Q_i$ targeted for coloring and the areas $B_i$ untargeted for coloring. The area setter 62 performs processes involved in step S60 in FIG. 3.

Suppose that the color adder 64 colors, on a pixel-by-pixel basis, the areas $Q_i$ targeted for coloring with colors based on the attribute information $A_1$ to $A_5$ respectively associated with the cut line segments $L_{c1}$ to $L_{c5}$, and also colors pixels $G_i$ each including a corresponding one of the cut line segments $L_{c1}$ to $L_{c5}$. In this case, the area setter 62 sets outer areas $M_i$ located within the pixels $G_i$ and outside the region X. When the areas $Q_i$ targeted for coloring are rendered on a pixel-by-pixel basis, the range of the areas $Q_i$ targeted for coloring may be set in accordance with any desired number of pixels.

Figure 10A:
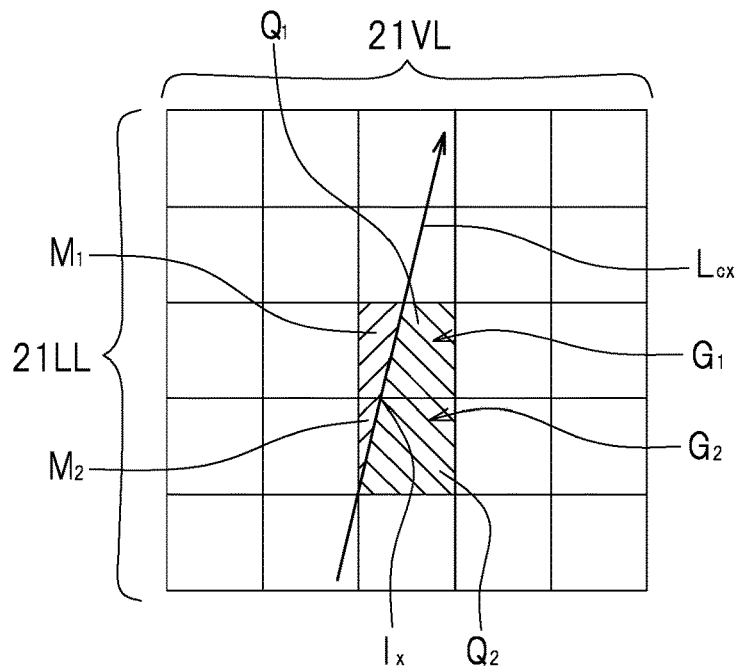
FIG. 10A is a schematic diagram illustrating a first method for setting areas targeted for coloring and outer areas.

As illustrated in FIG. 10A, with a first pixel $G_1$ and a second pixel $G_2$ including an intersection $I_x$ at which a cut line segment $L_{cx}$ intersects the scanning line 21LL, the area setter 62 sets an area $Q_1$ targeted for coloring and an outer area $M_1$ for the first pixel $G_1$, and sets an area $Q_2$ targeted for coloring and an outer area $M_2$ for the second pixel $G_2$.

Figure 10B:
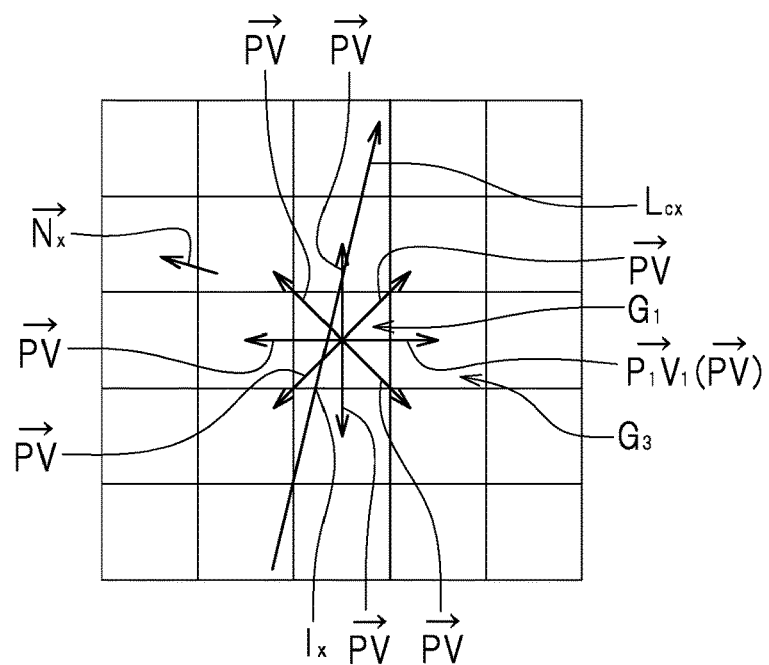
FIG. 10B is a schematic diagram illustrating the first method for setting the areas targeted for coloring and the outer areas.
Figure 10C:
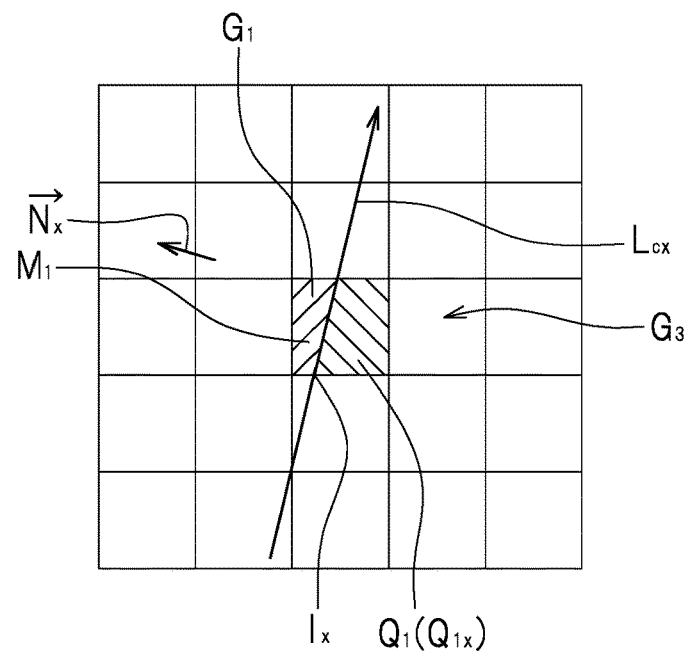
FIG. 10C is a schematic diagram illustrating the first method for setting the areas targeted for coloring and the outer areas.

As illustrated in FIG. 10B, the area setter 62 calculates, for the first pixel $G_1$, vectors PV directed to pixels surrounding the first pixel $G_1$, and then calculates an inner product of each vector PV and a normal vector $N_x$ associated with the cut line segment $L_{cx}$ overlapping with the first pixel $G_1$. The area setter 62 sets an area targeted for coloring so that this area is located in the direction of a vector $P_1V_1$ whose inner product with the normal vector $N_x$ is closest to −1. For example, suppose that the range of an area targeted for coloring is set within a single pixel from the cut line segment $L_{cx}$. In this case, as illustrated in FIG. 10C, a portion of the first pixel $G_1$, i.e., an area $Q_{1x}$, located in the direction of the vector $P_1V_1$ (see FIG. 10B) relative to the cut line segment $L_{cx}$ is set to be the area $Q_1$ targeted for coloring. The area $Q_1$ targeted for coloring is hatched with lines slanting downward from left to right in FIG. 10C. A portion of the first pixel $G_1$ located in the direction of the normal vector $N_x$ relative to the cut line segment $L_{cx}$ is set to be the outer area $M_1$. The outer area $M_1$ is hatched with lines slanting downward from right to left in FIG. 10C. When the range of areas targeted for coloring is set within two pixels from the cut line segment $L_{cx}$, the area $Q_{1x}$ and a third pixel $G_3$ are set to be the areas targeted for coloring. The area setter 62 may set the range of area (s) targeted for coloring within predetermined pixel(s), e.g., 1 to 20 pixels, from the cut line segment $L_{cx}$.

Figure 10D:
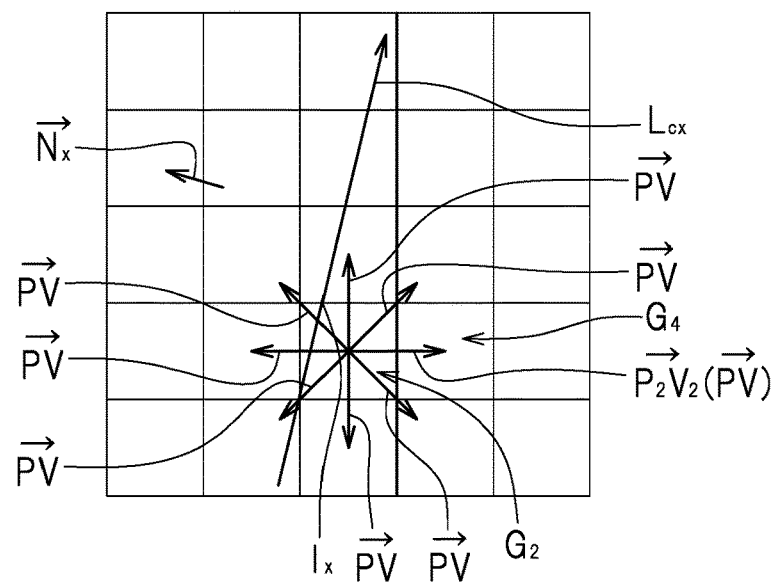
FIG. 10D is a schematic diagram illustrating the first method for setting the areas targeted for coloring and the outer areas.
Figure 10E:
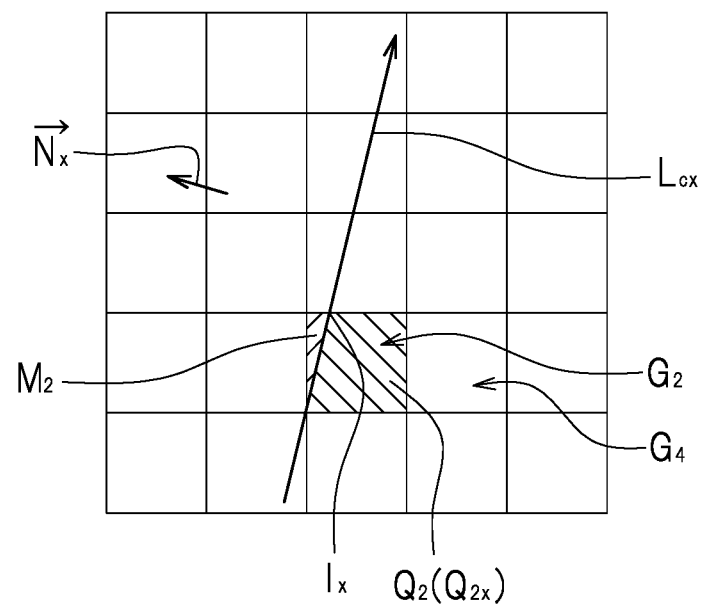
FIG. 10E is a schematic diagram illustrating the first method for setting the areas targeted for coloring and the outer areas.

As illustrated in FIG. 10D, the area setter 62 calculates, for the second pixel $G_2$, the vectors PV directed to pixels surrounding the second pixel $G_2$, and then calculates an inner product of each vector PV and the normal vector $N_x$ associated with the cut line segment $L_{cx}$ overlapping with the second pixel $G_2$. The area setter 62 sets an area targeted for coloring so that this area is located in the direction of a vector $P_2V_2$ whose inner product with the normal vector $N_x$ is closest to −1. For example, suppose that the range of an area targeted for coloring is set within a single pixel from the cut line segment $L_{cx}$. In this case, as illustrated in FIG. 10E, a portion of the second pixel $G_2$, i.e., an area $Q_{2x}$, located in the direction of the vector $P_2V_2$ (see FIG. 10D) relative to the cut line segment $L_{cx}$ is set to be the area $Q_2$ targeted for coloring. The area $Q_2$ targeted for coloring is hatched with lines slanting downward from left to right in FIG. 10E. A portion of the second pixel $G_2$ located in the direction of the normal vector $N_x$ relative to the cut line segment $L_{cx}$ is set to be the outer area $M_2$. The outer area $M_2$ is hatched with lines slanting downward from right to left in FIG. 10E. When the range of areas targeted for coloring is set within two pixels from the cut line segment $L_{cx}$, the area $Q_{2x}$ and a fourth pixel $G_4$ are set to be the areas targeted for coloring.

Figure 11A:
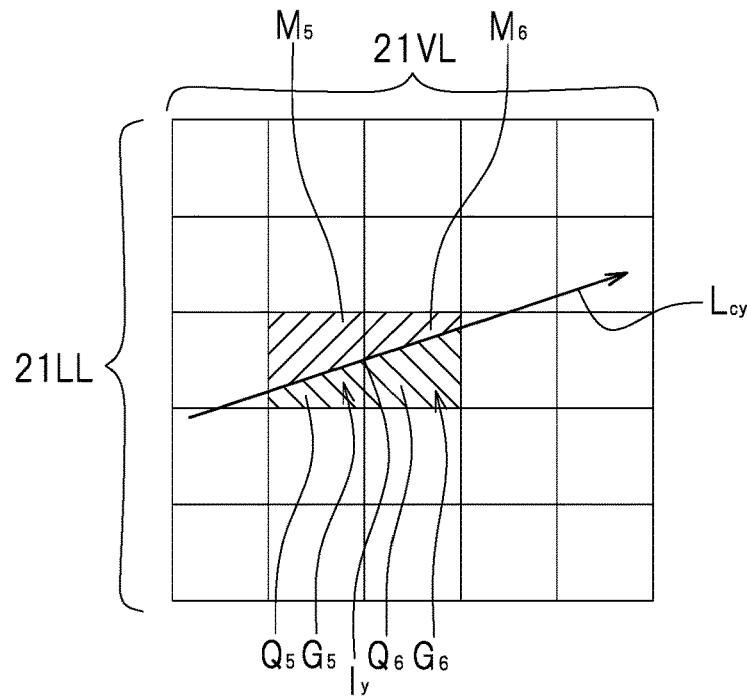
FIG. 11A is a schematic diagram illustrating a second method for setting areas targeted for coloring and outer areas.

As illustrated in FIG. 11A, with a fifth pixel $G_5$ and a sixth pixel $G_6$ including an intersection $I_y$ at which a cut line segment $L_{cy}$ intersects the scanning line 21VL, the area setter 62 sets an area $Q_5$ targeted for coloring and an outer area $M_5$ for the fifth pixel $G_5$, and sets an area $Q_6$ targeted for coloring and an outer area $M_6$ for the sixth pixel $G_6$.

Figure 11B:
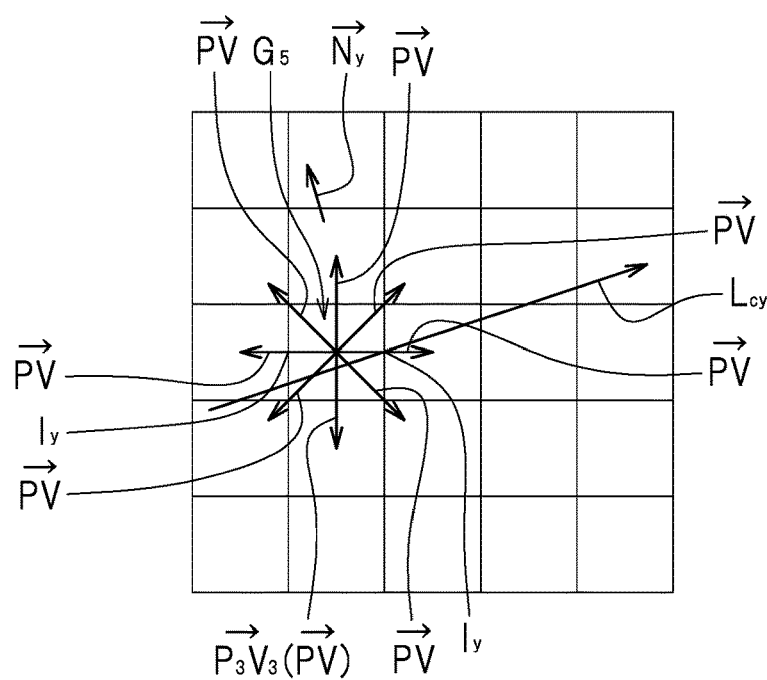
FIG. 11B is a schematic diagram illustrating the second method for setting the areas targeted for coloring and the outer areas.
Figure 11C:
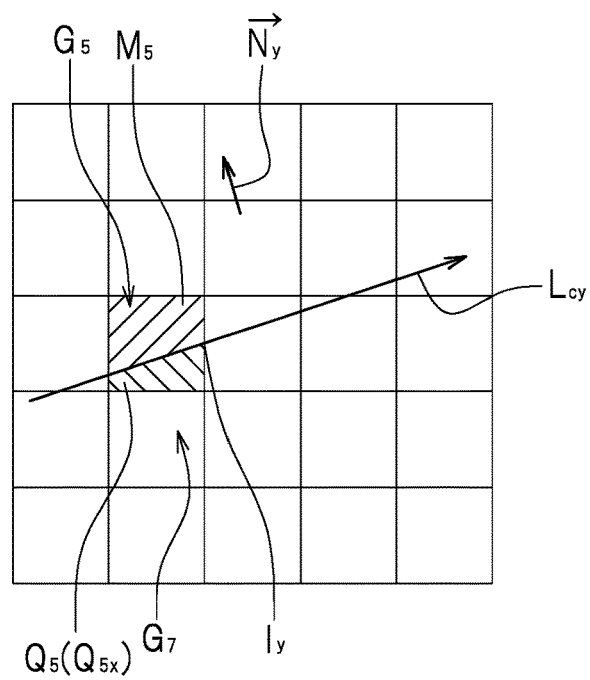
FIG. 11C is a schematic diagram illustrating the second method for setting the areas targeted for coloring and the outer areas.

As illustrated in FIG. 11B, the area setter 62 calculates, for the fifth pixel $G_5$, the vectors PV directed to pixels surrounding the fifth pixel $G_5$, and then calculates an inner product of each vector PV and a normal vector $N_y$ associated with the cut line segment $L_{cy}$ overlapping with the fifth pixel $G_5$. The area setter 62 sets an area targeted for coloring so that this area is located in the direction of a vector $P_3V_3$ whose inner product with the normal vector $N_y$ is closest to −1. For example, suppose that the range of an area targeted for coloring is set within a single pixel from the cut line segment $L_{cy}$. In this case, as illustrated in FIG. 11C, a portion of the fifth pixel $G_5$, i.e., an area $Q_{5x}$, located in the direction of the vector $P_3V_3$ (see FIG. 11B) relative to the cut line segment $L_{cy}$ is set to be the area $Q_5$ targeted for coloring. The area $Q_5$ targeted for coloring is hatched with lines slanting downward from left to right in FIG. 11C. A portion of the fifth pixel $G_5$ located in the direction of the normal vector $N_y$ relative to the cut line segment $L_{cy}$ is set to be the outer area $M_5$. The outer area $M_5$ is hatched with lines slanting downward from right to left in FIG. 11C. When the range of areas targeted for coloring is set within two pixels from the cut line segment $L_{cy}$, the area $Q_{5x}$ and a seventh pixel $G_7$ are set to be the areas targeted for coloring.

Figure 11D:
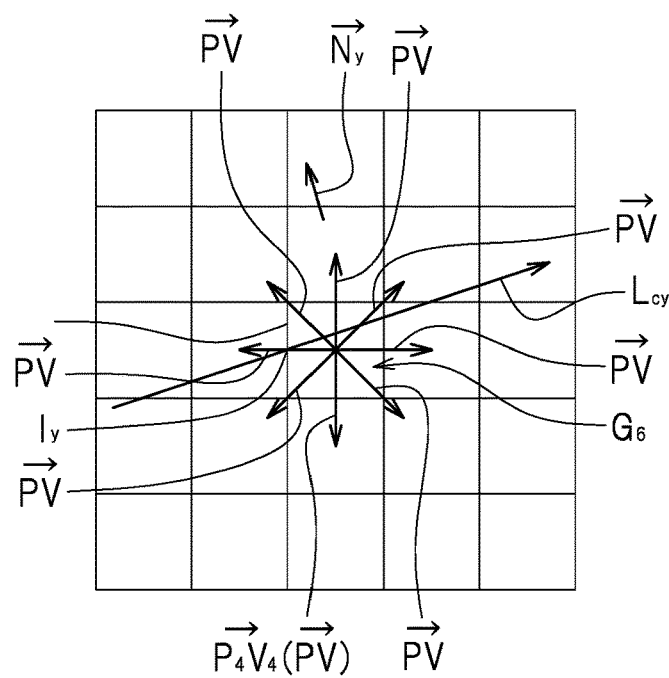
FIG. 11D is a schematic diagram illustrating the second method for setting the areas targeted for coloring and the outer areas.
Figure 11E:
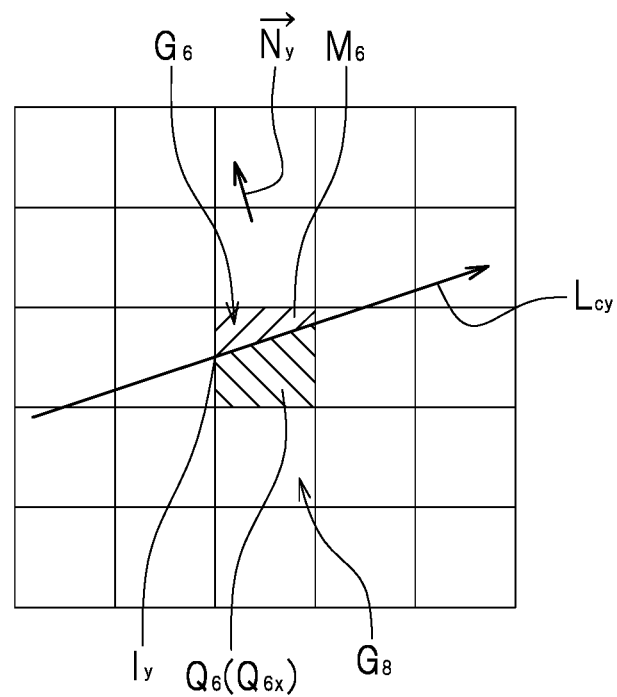
FIG. 11E is a schematic diagram illustrating the second method for setting the areas targeted for coloring and the outer areas.

As illustrated in FIG. 11D, the area setter 62 calculates, for the sixth pixel $G_6$, the vectors PV directed to pixels surrounding the sixth pixel $G_6$, and then calculates an inner product of each vector PV and the normal vector $N_y$ associated with the cut line segment $L_{cy}$ overlapping with the sixth pixel $G_6$. The area setter 62 sets an area targeted for coloring so that this area is located in the direction of a vector $P_4V_4$ whose inner product with the normal vector $N_y$ is closest to −1. For example, suppose that the range of an area targeted for coloring is set within a single pixel from the cut line segment $L_{cy}$. In this case, as illustrated in FIG. 11E, a portion of the sixth pixel $G_6$, i.e., an area $Q_{6x}$, located in the direction of the vector $P_4V_4$ (see FIG. 11D) relative to the cut line segment $L_{cy}$ is set to be the area $Q_6$ targeted for coloring. The area $Q_6$ targeted for coloring is hatched with lines slanting downward from left to right in FIG. 11E. A portion of the sixth pixel $G_6$ located in the direction of the normal vector $N_y$ relative to the cut line segment $L_{cy}$ is set to be the outer area $M_6$. The outer area $M_6$ is hatched with lines slanting downward from right to left in FIG. 11E. When the range of areas targeted for coloring is set within two pixels from the cut line segment $L_{cy}$, the area $Q_{6x}$ and an eighth pixel $G_8$ are set to be the areas targeted for coloring.

Figure 12:
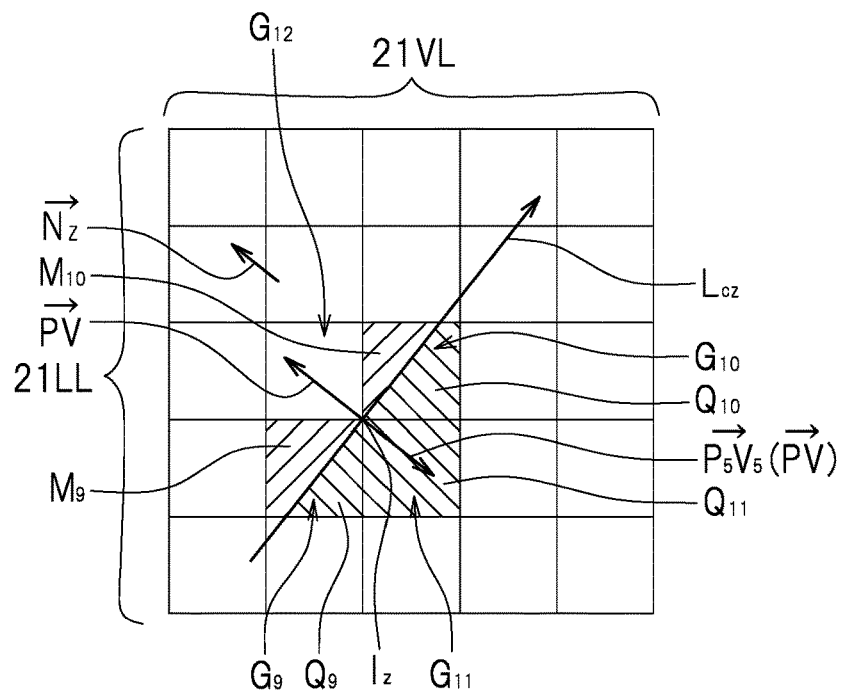
FIG. 12 is a schematic diagram illustrating a third method for setting areas targeted for coloring and outer areas.

As illustrated in FIG. 12, with a ninth pixel $G_9$ and a tenth pixel $G_{10}$ overlapping with a cut line segment $L_{cz}$ and including an intersection $I_z$ at which the cut line segment $L_{cz}$ intersects the scanning lines 21VL and 21LL, the area setter 62 sets an area $Q_9$ targeted for coloring and an outer area $M_9$ for the ninth pixel $G_9$ and sets an area $Q_{10}$ targeted for coloring and an outer area $M_{10}$ for the tenth pixel $G_{10}$ in a manner similar to that described above. For an eleventh pixel $G_{11}$ and a twelfth pixel $G_{12}$ including the intersection $I_z$ and not overlapping with the cut line segment $L_{cz}$, the area setter 62 calculates the vectors PV directed to the eleventh pixel $G_{11}$ and the twelfth pixel $G_{12}$ from the intersection $I_z$. The area setter 62 then calculates an inner product of each vector PV and a normal vector $N_z$ associated with the cut line segment $L_{cz}$. The area setter 62 sets an area targeted for coloring so that this area is located in the direction of a vector $P_5V_5$ whose inner product with the normal vector $N_z$ is closest to −1. For example, supposing that the range of an area targeted for coloring is set within a single pixel from the cut line segment $L_{cz}$, the eleventh pixel $G_{11}$ is set to be an area $Q_{11}$ targeted for coloring. In this case, the area setter 62 sets no area targeted for coloring for the twelfth pixel $G_{12}$ located in the direction of the normal vector $N_z$ relative to the cut line segment $L_{cz}$.

Figure 13:
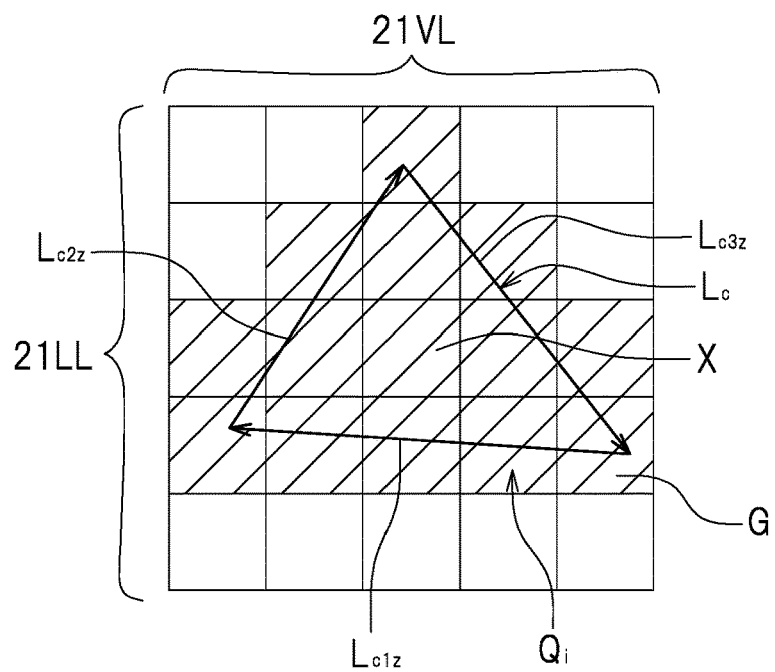
FIG. 13 is a schematic diagram illustrating another sliced model generated.

As illustrated in FIG. 13, when the contour polyline $L_c$ is generated for each triangular patch, the area setter 62 sets, as the areas $Q_i$ targeted for coloring, the region X surrounded by the contour polyline $L_c$ and pixels G including the region X. The areas $Q_i$ targeted for coloring are hatched in FIG. 13.

Figure 9:
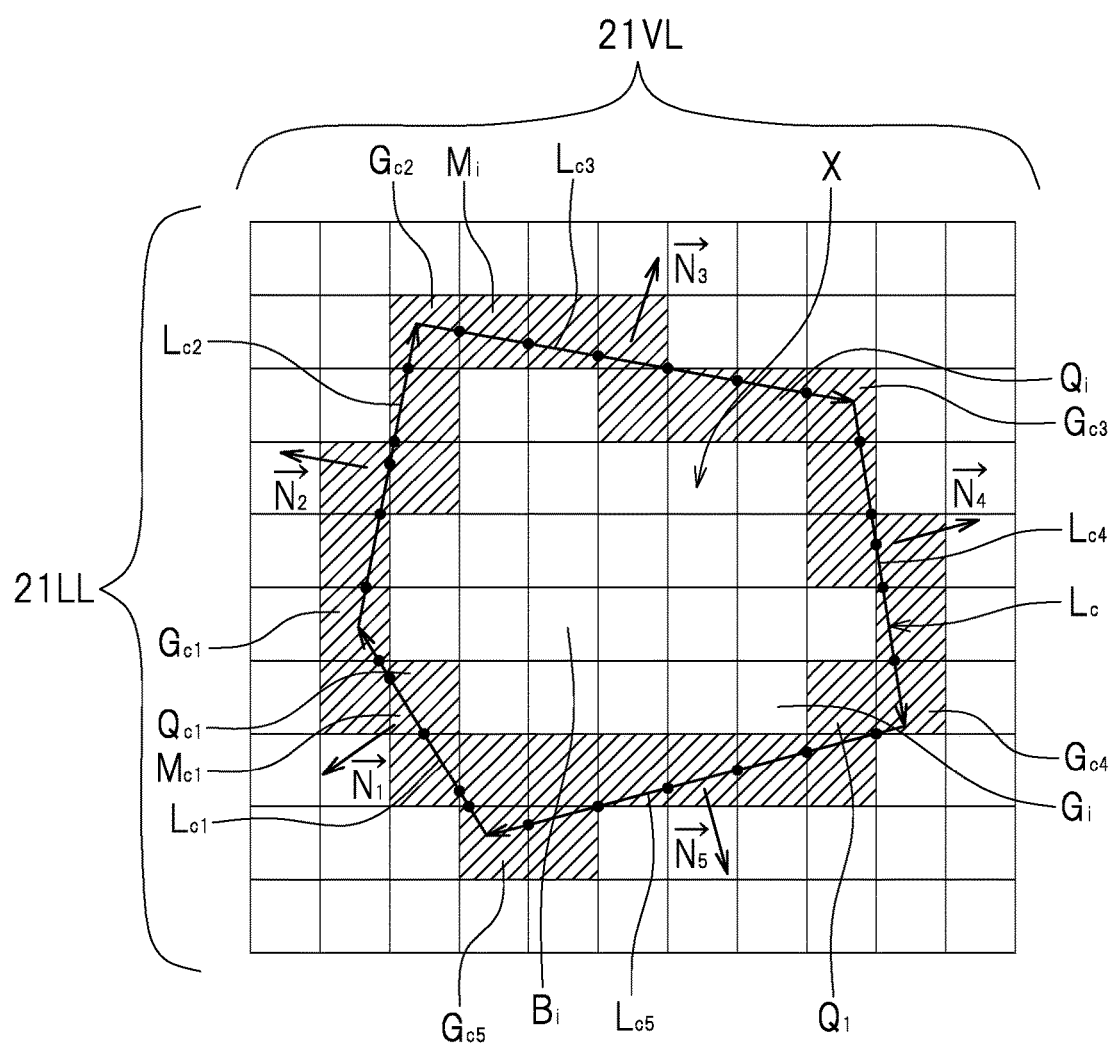
FIG. 9 is a schematic diagram illustrating a sliced model generated.

For a region surrounded by a contour polyline that has been converted into a bitmap output image coordinate system, the color adder 64 (see FIG. 4) colors a plurality of areas targeted for coloring, each adjacent to a corresponding one of cut line segments, with colors based on attribute information associated with the cut line segments, thus generating a full-color sliced model. In the example illustrated in FIG. 10C, the color adder 64 colors the area $Q_1$ targeted for coloring and adjacent to the cut line segment $L_{cx}$ with a color based on attribute information $A_x$ associated with the cut line segment $L_{cx}$. For example, as illustrated in FIG. 9, the color adder 64 colors an area $Q_{c1}$ targeted for coloring and adjacent to the cut line segment $L_{c1}$ with a color based on the attribute information $A_1$ associated with the cut line segment $L_{c1}$. In the example illustrated in FIG. 9, the color adder 64 colors each area located within a single pixel from a corresponding one of the cut line segments $L_{c1}$ to $L_{c5}$. The color adder 64 performs processes involved in step S70 in FIG. 3.

Suppose that the color adder 64 colors, on a pixel-by-pixel basis, an area targeted for coloring with a color based on attribute information associated with a corresponding one of cut line segments, and colors each pixel including a corresponding one of the cut line segments. In this case, the color adder 64 colors an outer area within each pixel and outside the region X with a color based on attribute information associated with a corresponding one of the cut line segments. In the example illustrated in FIG. 10C, the color adder 64 colors the outer area $M_1$ with a color based on the attribute information $A_x$ associated with the cut line segment $L_{cx}$. For example, as illustrated in FIG. 9, the color adder 64 colors an outer area $M_{c1}$ with a color based on the attribute information $A_1$ associated with the cut line segment $L_{c1}$.

When a pixel includes a plurality of cut line segments, e.g., a first cut line segment and a second cut line segment, the color adder 64 colors this pixel with a first color based on first attribute information associated with the first cut line segment, and a second color based on second attribute information associated with the second cut line segment. For example, suppose that a pixel to be colored with the first color based on the first attribute information associated with the first cut line segment is also to be colored with the second color based on the second attribute information associated with the second cut line segment. In this case, the color adder 64 colors this pixel with an intermediate color between the first color and the second color. In the example illustrated in FIG. 9, a pixel $G_{c1}$ to be colored with the first color based on the attribute information $A_1$ associated with the cut line segment $L_{c1}$ is also to be colored with the second color based on the attribute information $A_2$ associated the cut line segment $L_{c2}$. In this case, the color adder 64 colors the pixel $G_{c1}$ with an intermediate color between the first color and the second color. A pixel $G_{c2}$ is colored with an intermediate color between the second color and a third color based on the attribute information $A_3$ associated with the cut line segment $L_{c3}$. A pixel $G_{c3}$ is colored with an intermediate color between the third color and a fourth color based on the attribute information $A_4$ associated with the cut line segment $L_{c4}$. A pixel $G_{c4}$ is colored with an intermediate color between the fourth color and a fifth color based on the attribute information $A_5$ associated with the cut line segment $L_{c5}$. A pixel $G_{c5}$ is colored with an intermediate color between the fifth color and the first color.

The color adder 64 may be configured or programmed so that when a pixel is to be colored with a color based on attribute information associated with a corresponding one of the cut line segments, the color adder 64 does not color this pixel with a color based on attribute information associated with the other corresponding one of the cut line segments. In the example illustrated in FIG. 9, the color adder 64 may color the pixel $G_{c1}$, which is to be colored with the first color based on the attribute information $A_1$ associated with the cut line segment $L_{c1}$, with the first color instead of coloring the pixel $G_{c1}$ with the second color based on the attribute information $A_2$ associated with the cut line segment $L_{c2}$ or with an intermediate color between the first color and the second color. Alternatively, the color adder 64 may color the pixel $G_{c1}$ with the second color.

When attribute information associated with each cut line segment includes color information, the color adder 64 colors an area targeted for coloring and/or an outer area with a color corresponding to an RGB value indicated by the color information. When attribute information associated with each cut line segment includes reflection information in addition to color information, the color adder 64 colors an area targeted for coloring and/or an outer area with a color corresponding to an RGB value calculated using the Phong reflection model, which is known in the art.

Suppose that the region X surrounded by the contour polyline $L_c$, which has been converted into a bitmap output image coordinate system, is a plane overlapping with the slicing plane S (see FIG. 6D) defined when a three-dimensional model is sliced at predetermined intervals, or in other words, a contour polyline is generated for each triangular patch. In this case, as illustrated in FIG. 13, the color adder 64 fills in an entirety of the region X and the pixels G, including the region X, with a color based on attribute information associated with cut line segments $L_{c1z}$ to $L_{c3z}$. In this example, the attribute information associated with the cut line segment $L_{c1z}$, the attribute information associated with the cut line segment $L_{c2z}$, and the attribute information associated with the cut line segment $L_{c3z}$ are identical to each other.

As described thus far, the sliced model generating apparatus 100 generates full-color sliced models from a three-dimensional model that includes attribute information including, for example, color information. More specifically, the sliced model generating apparatus 100 generates full-color sliced models in accordance with a three-dimensional model that includes not only information on normal vectors of planes of triangles included in the three-dimensional model and coordinate values of three vertices of each triangle, but also attribute information, such as color information. Using the full-color sliced models generated by the sliced model generating apparatus 100, the three-dimensional printing apparatus 10A, which is separate from the sliced model generating apparatus 100, applies a binder to the powdery materials 19, and sequentially stacks the powdery material layers 18A each having a cross-sectional shape conforming to the associated sliced model, thus printing the three-dimensional object 18 in full color.

As illustrated in FIG. 9, the area setter 62 (see FIG. 4) of the sliced model generating apparatus 100 according to this preferred embodiment sets, at positions inward of the areas $Q_i$ targeted for coloring, the areas $B_i$ untargeted for coloring, which are not to be colored with colors based on the attribute information $A_1$ to $A_5$ respectively associated with the cut line segments $L_{c1}$ to $L_{c5}$. Because the areas $B_i$ untargeted for coloring are set, the region X surrounded by the contour polyline $L_c$ is not entirely colored in the sliced model generated. Thus, the sliced model generated has a hollow structure even when a three-dimensional model for a three-dimensional object to be printed does not have a hollow structure. Using such hollow sliced models reduces the amount of materials used in printing the three-dimensional object by the three-dimensional printing apparatus 10A, which is separate from the sliced model generating apparatus 100.

As illustrated in FIG. 9, the area setter 62 (see FIG. 4) of the sliced model generating apparatus 100 according to this preferred embodiment colors the outer areas $M_i$ with colors based on the attribute information $A_1$ to $A_5$ respectively associated with the cut line segments $L_{c1}$ to $L_{c5}$. Thus, a full-color sliced model is more reliably generated from a three-dimensional model that includes attribute information including, for example, color information.

As illustrated in FIG. 9, the color adder 64 of the sliced model generating apparatus 100 according to this preferred embodiment colors the pixel $G_{c1}$ with an intermediate color between the first color based on the attribute information $A_1$ associated with the cut line segment $L_{c1}$ and the second color based on the attribute information $A_2$ associated with the cut line segment $L_{c2}$. Thus, the color of the sliced model generated changes smoothly at a boundary between the first color and the second color.

The color adder 64 of the sliced model generating apparatus 100 according to this preferred embodiment may be configured or programmed not to color the pixel $G_{c1}$, which is to be colored with the first color based on the attribute information $A_1$ associated with the cut line segment $L_{c1}$, with the second color based on the attribute information $A_2$ associated with the cut line segment $L_{c2}$. In this case, the sliced model generated has a clear boundary between different colors.

When the region X is a plane overlapping with the slicing plane S (see FIG. 6D) defined when a three-dimensional model is sliced at predetermined intervals, the color adder 64 of the sliced model generating apparatus 100 according to this preferred embodiment fills in an entirety of the region X with a color based on the attribute information associated with the cut line segments $L_{c1z}$ to $L_{c3z}$ as illustrated in FIG. 13. Thus, full-color sliced models are more reliably generated from a three-dimensional model that includes attribute information including, for example, color information.

The color adder 64 of the sliced model generating apparatus 100 according to this preferred embodiment may color the areas $Q_i$ targeted for coloring and the outer areas $M_i$ with colors based on color information and reflection information associated with the cut line segments $L_{c1}$ to $L_{c5}$. Thus, a full-color sliced model to which not only colors but also luster is added is more accurately generated from a three-dimensional model that includes attribute information including, for example, color information.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A three-dimensional printing system comprising:
a sliced model generating apparatus that slices, at predetermined intervals, a three-dimensional model for a three-dimensional object to be printed, and generates sliced models each representing a cross section of the three-dimensional object, and
a three-dimensional printing apparatus to print a full-color three-dimensional object based on the sliced models generated by the sliced model generating apparatus, wherein
the sliced model generating apparatus includes:
a storage that stores a three-dimensional model that includes attribute information including at least color information;
a generator that slices, at the predetermined intervals, the three-dimensional model stored in the storage, and generates only one contour polyline including a plurality of line segments;
an information adder that associates each of the plurality of line segments with the attribute information of the three-dimensional model;
a converter that converts the only one contour polyline including the line segments associated with the attribute information into an image coordinate system;
an area setter that sets a plurality of areas targeted for coloring in a region surrounded by the only one contour polyline converted into the image coordinate system, each of the areas targeted for coloring being adjacent to a corresponding one of the line segments; and
a color adder that colors each of the areas targeted for coloring with a color based on the attribute information associated with a corresponding one of the line segments, and generates a sliced model;
when the color adder colors, on a pixel-by-pixel basis, each of the areas targeted for coloring with a color based on the attribute information associated with a corresponding one of the line segments, and colors pixels each including a corresponding one of the line segments, the area setter sets a plurality of outer areas each located within a corresponding one of the pixels and outside the region surrounded by the one contour polyline converted into the image coordinate system, and the color adder colors each of the outer areas with a color based on the attribute information associated with a corresponding one of the line segments; and
assuming that the line segments include a first line segment and a second line segment and that one of the pixels to be colored with a first color based on first attribute information associated with the first line segment is also to be colored with a second color based on second attribute information associated with the second line segment, the color adder colors the one of the pixels with an intermediate color between the first color and the second color.

2. The three-dimensional printing system according to claim 1, wherein the area setter sets, at a position inward of the areas targeted for coloring, an area untargeted for coloring that is not to be colored with a color based on the attribute information associated with a corresponding one of the line segments.

3. The three-dimensional printing system according to claim 1, wherein when the region surrounded by the one contour polyline converted into the image coordinate system is a plane overlapping with a slicing plane defined when the three-dimensional model is sliced at the predetermined intervals, the color adder fills in an entirety of the region surrounded by the one contour polyline converted into the image coordinate system with a color based on the attribute information associated with the line segments.

4. The three-dimensional printing system according to claim 1, wherein
the attribute information further includes reflection information; and
the color adder colors each of the areas targeted for coloring with a color based on the color information and the reflection information associated with a corresponding one of the line segments.

5. A three-dimensional printing system comprising:
a sliced model generating apparatus that slices, at predetermined intervals, a three-dimensional model for a three-dimensional object to be printed, and generates sliced models each representing a cross section of the three-dimensional object, and
a three-dimensional printing apparatus to print a full-color three-dimensional object based on the sliced models generated by the sliced model generating apparatus, wherein
the sliced model generating apparatus includes:
a storage that stores a three-dimensional model that includes attribute information including at least color information;
a generator that slices, at the predetermined intervals, the three-dimensional model stored in the storage, and generates only one contour polyline including a plurality of line segments;
an information adder that associates each of the plurality of line segments with the attribute information of the three-dimensional model;
a converter that converts the only one contour polyline including the line segments associated with the attribute information into an image coordinate system;
an area setter that sets a plurality of areas targeted for coloring in a region surrounded by the only one contour polyline converted into the image coordinate system, each of the areas targeted for coloring being adjacent to a corresponding one of the line segments; and
a color adder that colors each of the areas targeted for coloring with a color based on the attribute information associated with a corresponding one of the line segments, and generates a sliced model;
when the color adder colors, on a pixel-by-pixel basis, each of the areas targeted for coloring with a color based on the attribute information associated with a corresponding one of the line segments, and colors pixels each including a corresponding one of the line segments, the area setter sets a plurality of outer areas each located within a corresponding one of the pixels and outside the region surrounded by the one contour polyline converted into the image coordinate system, and the color adder colors each of the outer areas with a color based on the attribute information associated with a corresponding one of the line segments; and
when one of the pixels is to be colored with a color based on the attribute information associated with a corresponding one of the line segments, the color adder does not color the one of the pixels with a color based on the attribute information associated with another corresponding one of the line segments.

* * * * *